United States Patent
Kaku

(10) Patent No.: US 12,475,650 B2
(45) Date of Patent: Nov. 18, 2025

(54) TERMINAL APPARATUS

(71) Applicant: TOYOTA JIDOSHA KABUSHIKI KAISHA, Aichi-ken (JP)

(72) Inventor: Wataru Kaku, Musashino (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 125 days.

(21) Appl. No.: 18/481,235

(22) Filed: Oct. 5, 2023

(65) Prior Publication Data
US 2024/0119674 A1    Apr. 11, 2024

(30) Foreign Application Priority Data
Oct. 7, 2022    (JP) .............................. 2022-162662

(51) Int. Cl.
*G06T 19/00*    (2011.01)

(52) U.S. Cl.
CPC ................... *G06T 19/00* (2013.01)

(58) Field of Classification Search
None
See application file for complete search history.

(56) References Cited

U.S. PATENT DOCUMENTS

2016/0129638 A1* 5/2016 Bostick ............ G06F 30/00
                                                        700/98
2018/0332254 A1  11/2018 Sakai et al.
2019/0371028 A1* 12/2019 Harrises ........... G02B 27/0172
2020/0413007 A1  12/2020 Horio et al.
2021/0011562 A1*  1/2021 Connellan .......... G06F 3/0346
2021/0208687 A1   7/2021 Koike et al.
2025/0124650 A1*  4/2025 Cao .................... G06T 5/50

FOREIGN PATENT DOCUMENTS

JP    2019-149626 A    9/2019
JP    2020-145623 A    9/2020
JP    2021-141346 A    9/2021
WO    2017/098780 A1   6/2017

OTHER PUBLICATIONS

Kazuo Ikeshiro et al., "An Estimation of Shapes in Occluded Areas based on Fast Level Set Method for Motion Capture in Multiple Human Bodies.", IEICE Technical Report, Dec. 2, 2010, pp. 37-43, vol. 110 No. 330, The Institute of Electronics, Information and Communication Engineers, Tokyo, Japan, 18pp.

* cited by examiner

*Primary Examiner* — Saptarshi Mazumder
(74) *Attorney, Agent, or Firm* — HAUPTMAN HAM, LLP

(57) ABSTRACT

A terminal apparatus includes a communication interface, a display, an imager configured to capture images of a user, and a controller configured to communicate using the communication interface. The controller is configured to receive information for displaying a 3D model representing another user, who uses another terminal apparatus, based on a captured image of the another user and a supplementary image that includes an invisible portion of the captured image, and control the display to display a 3D model in which the invisible portion in a 3D model based on the captured image is supplemented by a 3D model based on the supplementary image.

4 Claims, 6 Drawing Sheets

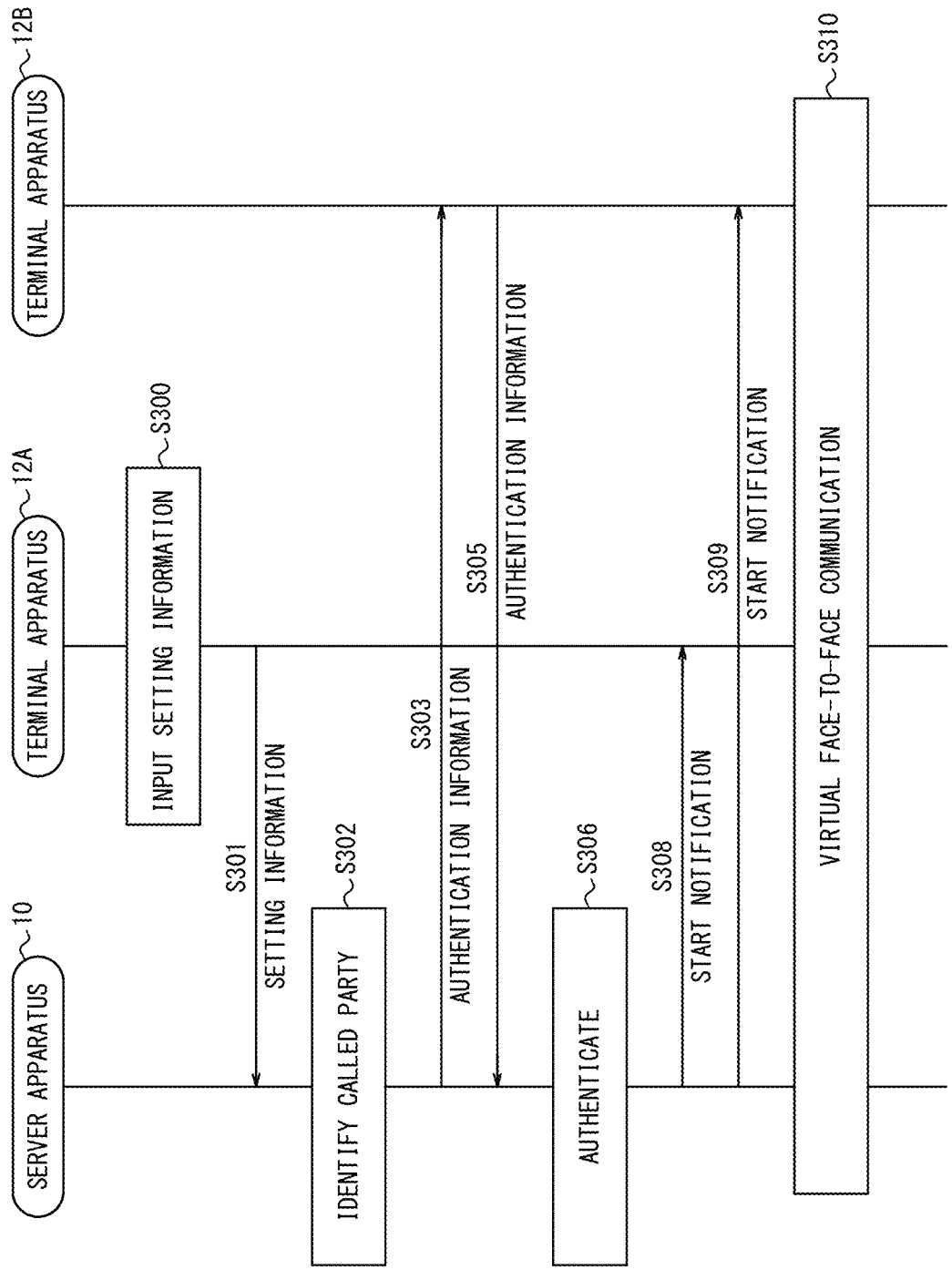

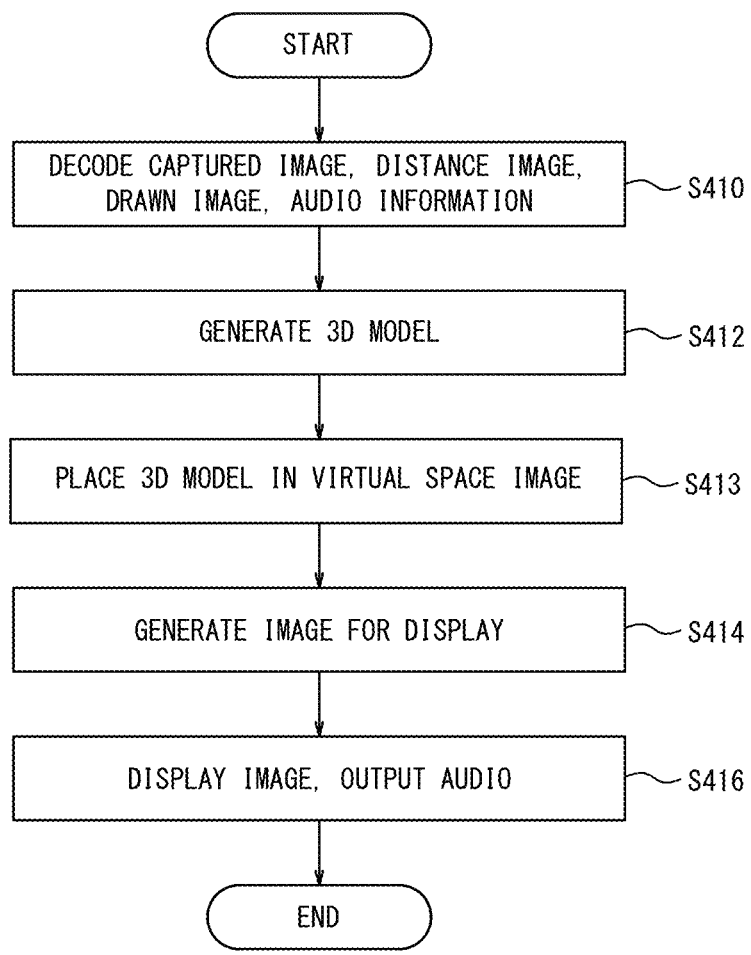

TERMINAL APPARATUS

CROSS-REFERENCE TO RELATED APPLICATION

This application claims priority to Japanese Patent Application No. 2022-162662, filed on Oct. 7, 2022, the entire contents of which are incorporated herein by reference.

TECHNICAL FIELD

The present disclosure relates to a terminal apparatus.

BACKGROUND

Technology for using computers connected via a network to enable users of the computers to talk with other users by transmitting and receiving images and sounds to and from each other is known. For example, Patent Literature (PTL) 1 discloses an interactive communication system that displays captured images of the space on the communication partner side, acquired from the communication partner side, on a display.

CITATION LIST

Patent Literature
    PTL 1: JP 2021-141346 A

SUMMARY

Technology that enables users to transmit and receive images and sound to and from each other for virtual face-to-face communication has room for improvement in terms of the realistic feel of communication.

The present disclosure provides a terminal apparatus and the like that can enhance the realistic feel of virtual face-to-face communication.

A terminal apparatus in the present disclosure includes:
    a communication interface;
    a display;
    an imager configured to capture images of a user; and
    a controller configured to communicate using the communication interface, wherein
    the controller is configured to
        receive information for displaying a 3D model representing another user, who uses another terminal apparatus, based on a captured image of the another user and a supplementary image that includes an invisible portion of the captured image, and
        control the display to display a 3D model in which the invisible portion in a 3D model based on the captured image is supplemented by a 3D model based on the supplementary image.

According to the terminal apparatus and the like in the present disclosure, the realistic feel and convenience of virtual face-to-face communication can be enhanced.

BRIEF DESCRIPTION OF THE DRAWINGS

In the accompanying drawings:
FIG. 3 is a sequence diagram illustrating an operation example of the call system;
FIG. 4B is a flowchart illustrating an example of operations of a terminal apparatus.

DETAILED DESCRIPTION

Embodiments are described below.

Figure 1:
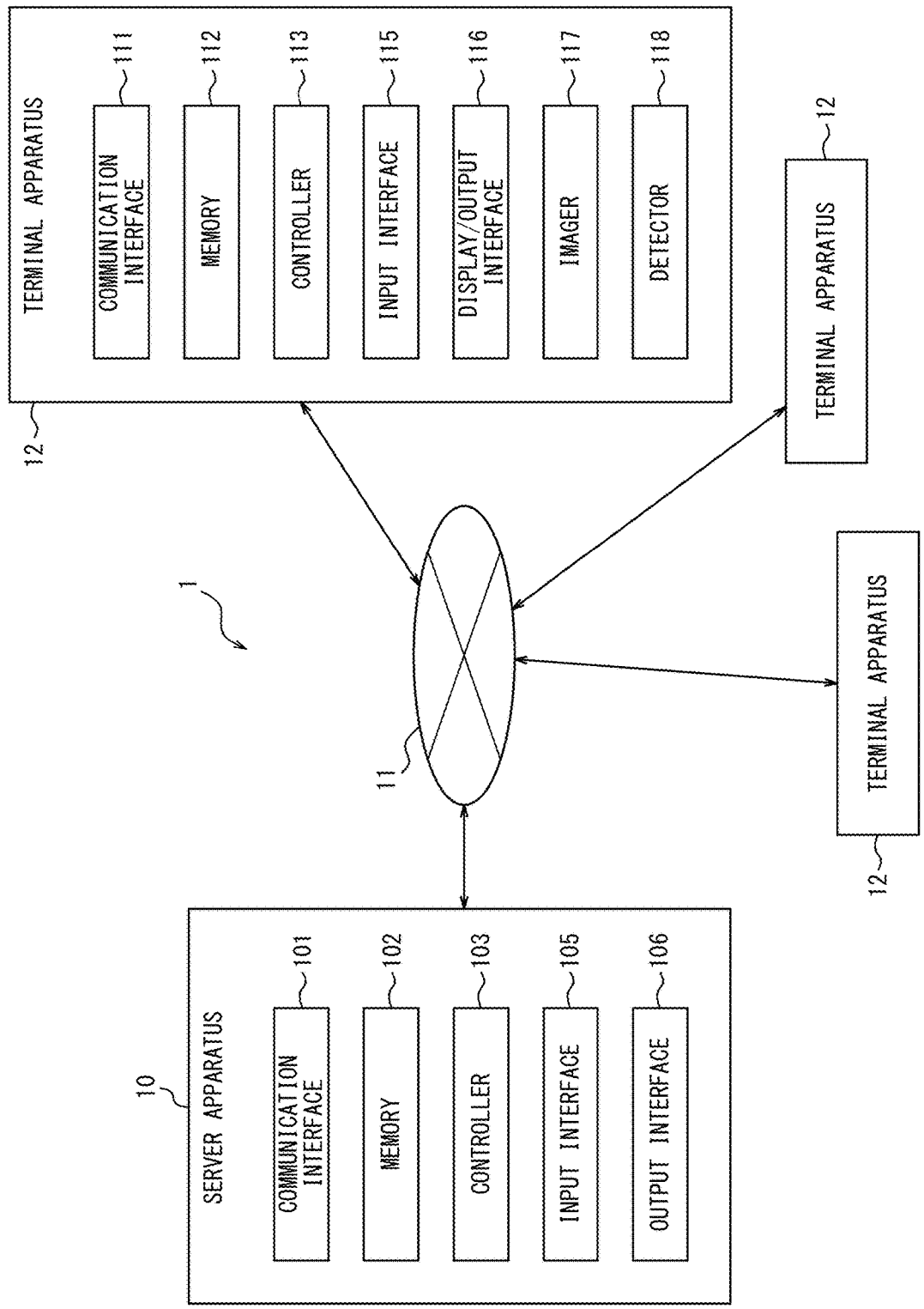
FIG. 1 is a diagram illustrating a configuration example of a call system.

FIG. 1 is a diagram illustrating an example configuration of a call system 1 in an embodiment. The call system 1 includes a plurality of terminal apparatuses 12 and a server apparatus 10 that are connected via a network 11 to enable communication of information with each other. The call system 1 is a system to enable users to perform virtual face-to-face communication with each other by transmitting and receiving images, voice, and the like using the terminal apparatuses 12 (hereinafter referred to as "virtual face-to-face communication").

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 transmits and receives, and performs information processing on, information necessary to provide virtual face-to-face communication.

The terminal apparatus 12 is an information processing apparatus provided with communication functions and input/output functions for images, audio, and the like and is used by a user. The terminal apparatus 12 is, for example, a smartphone, a tablet terminal, a personal computer, digital signage, or the like.

The network 11 may, for example, be the Internet or may include an ad hoc network, a local area network (LAN), a metropolitan area network (MAN), other networks, or any combination thereof.

In the present embodiment, the terminal apparatus 12 receives information for displaying a 3D model representing another user, who uses another terminal apparatus 12, based on a captured image of the other user and a supplementary image that includes an invisible portion of the captured image, and displays a 3D model in which the invisible portion in a 3D model based on the captured image is supplemented by a 3D model based on the supplementary image. During virtual face-to-face communication between the user of the terminal apparatus 12 (hereinafter referred to as the "corresponding user") and another user of another terminal apparatus 12 (hereinafter referred to as the "other user"), a portion is shielded from the imager by a hand holding a drawing tool when the other user draws an image of text, figures, or the like on the touch panel, and the portion becomes invisible. This portion is supplemented by a 3D model based on the supplementary image. The corresponding user thus sees a more natural 3D model of the other user and experiences a sense of reality, as though as the users were communicating face-to-face through the transparent panel while drawing on the transparent panel. The realistic feel of virtual face-to-face communication can thereby be enhanced.

Respective configurations of the server apparatus 10 and the terminal apparatuses 12 are described in detail.

The server apparatus 10 includes a communication interface 101, a memory 102, a controller 103, an input interface 105, and an output interface 106. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The input interface 105 includes one or more interfaces for input. The interface for input is, for example, a physical key, a capacitive key, a pointing device, a touch panel integrally provided with a display, or a microphone that receives audio input. The input interface 105 accepts operations to input information used for operation of the server apparatus 10 and transmits the inputted information to the controller 103.

The output interface 106 includes one or more interfaces for output. The interface for output is, for example, a display or a speaker. The display is, for example, a Liquid Crystal Display (LCD) or an organic Electro Luminescent (EL) display. The output interface 106 outputs information obtained by the operations of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Each terminal apparatus 12 includes a communication interface 111, a memory 112, a controller 113, an input interface 115, a display/output interface 116, an imager 117, and a detector 118.

The communication interface 111 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 111 and communicates information with the server apparatus 10 and the like over the network 11.

The memory 112 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 112 functions as, for example, a main memory, an auxiliary memory, or a cache memory. The memory 112 stores information to be used for the operations of the controller 113 and information obtained by the operations of the controller 113.

The controller 113 has one or more general purpose processors, such as CPUs or Micro Processing Units (MPUs), or one or more dedicated processors, such as GPUs, that are dedicated to specific processing. Alternatively, the controller 113 may have one or more dedicated circuits such as FPGAs or ASICs. The controller 113 is configured to perform overall control of the operations of the terminal apparatus 12 by operating according to the control/processing programs or operating according to operation procedures implemented in the form of circuits. The controller 113 then transmits and receives various types of information to and from the server apparatus 10 and the like via the communication interface 111 and executes the operations according to the present embodiment.

The input interface 115 includes a touch panel, integrated with a display, and one or more interfaces for input. The input interface 115 detects the input of drawn images based on the displacement of the contact position of a finger, pointing device, or the like on the touch panel and transmits the detected information to the controller 113. The interface for input includes, for example, a physical key, a capacitive key, or a pointing device. The interface for input may also include a microphone that accepts audio input. The interface for input may further include a scanner, camera, or IC card reader that scans an image code. The input interface 115 accepts operations for inputting information to be used in the operations of the controller 113 and transmits the inputted information to the controller 113.

The display/output interface 116 includes a display for displaying images and one or more interfaces for output. The display is, for example, an LCD or an organic EL display. The interface for output includes, for example, a speaker. The display/output interface 116 outputs information obtained by the operations of the controller 113.

The imager 117 includes a camera that captures an image of a subject using visible light and a distance measuring sensor that measures the distance to the subject to acquire a distance image. The camera captures a subject at, for example, 15 to 30 frames per second to produce a moving image formed by a series of captured images. Distance measurement sensors include ToF (Time Of Flight) cameras, LiDAR (Light Detection And Ranging), and stereo cameras and generate distance images of a subject that contain distance information. The imager 117 transmits the captured images and the distance images to the controller 113.

The detector 118 includes one or more sensors, or interfaces with sensors, that detect the condition of various components in the terminal apparatus 12 or conditions around the terminal apparatus 12 and transmits information indicating the results of detection by the sensors to the controller 113. The sensors include a proximity sensor that detects the proximity of an object to any part of the terminal apparatus 12 using electromagnetic waves, sound waves, or the like. The proximity sensor detects the proximity of a finger or other object, for example, to the touch panel of the input interface 115 and transmits the detection result to the controller 113.

The functions of the controller 113 are realized by a processor included in the controller 113 executing a control program. The control program is a program for causing the processor to function as the controller 113. Some or all of the functions of the controller 113 may be realized by a dedicated circuit included in the controller 113. The control program may be stored on a non-transitory recording/storage medium readable by the terminal apparatus 12 and be read from the medium by the terminal apparatus 12.

Figure 2A:
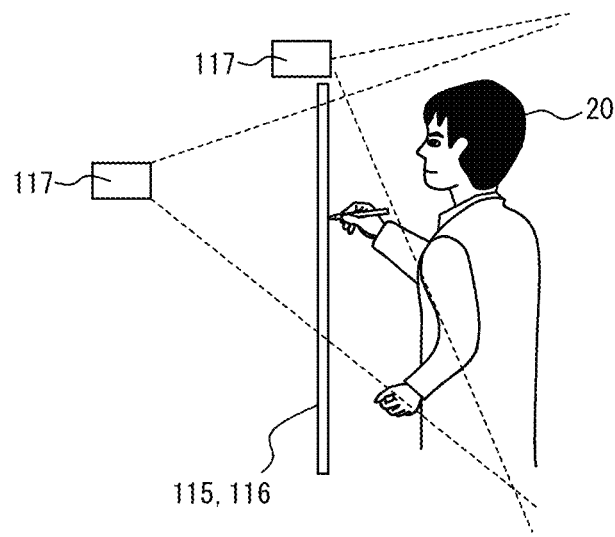
FIG. 2A is a diagram illustrating use of a terminal apparatus.
Figure 2B:
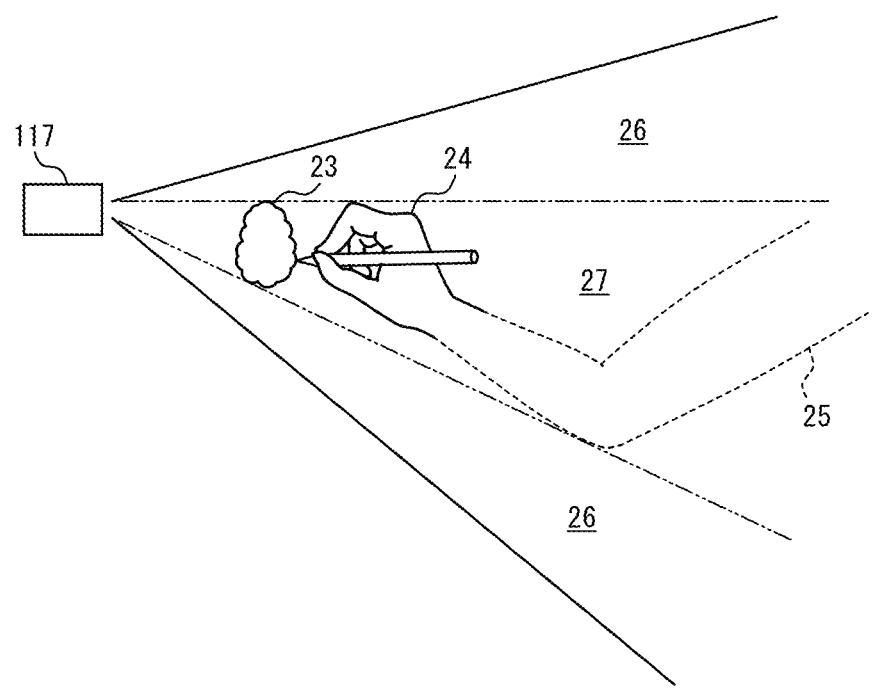
FIG. 2B is a diagram illustrating image processing by the terminal apparatus.
Figure 2C:
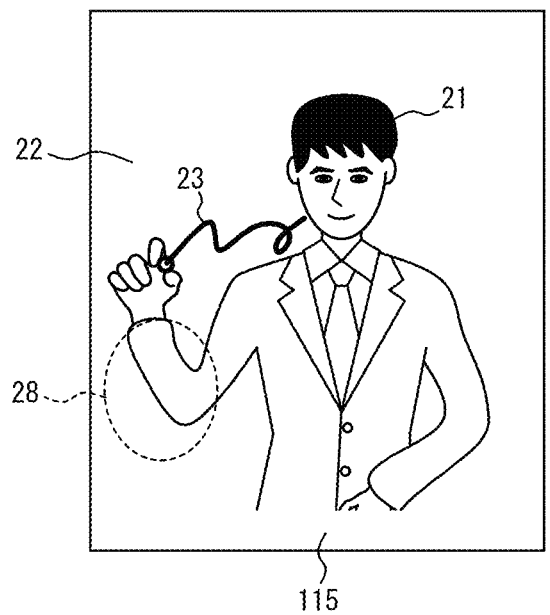
FIG. 2C is a diagram illustrating use of the terminal apparatus.

FIGS. 2A to 2C illustrate a user using the terminal apparatus 12 for face-to-face communication.

FIG. 2A is a diagram illustrating the corresponding user using the terminal apparatus 12. A corresponding user 20 makes calls while drawing text, graphics, and the like on the touch panel of the input interface 115, which is superimposed on the display of the display/output interface 116. The display/output interface 116 displays images and other information corresponding to contact by a pointing device or the like. The imager 117 is provided at a position where at least the upper body of the corresponding user can be imaged, such as the top of the display, or behind the display in a case in which the display is configured to be transparent.

The controller 113 acquires a captured image and a distance image of the corresponding user 20 via the imager 117. The controller 113 also collects the audio of speech by the corresponding user 20 with the microphone in the input interface 115. Furthermore, from the input interface 115, the controller 113 acquires information on the drawn image that the corresponding user 20 draws on the touch panel of the input interface 115. The controller 113 encodes the captured image and distance image of the corresponding user 20, which are for generating the 3D model of the corresponding user 20, the drawn image that is drawn by the corresponding user 20, and audio information, which is for reproducing the speech of the corresponding user 20, to generate encoded information. The controller 113 may perform any appropriate processing (such as resolution change, trimming, or supplementing) on the captured images and the like at the time of encoding.

FIG. 2B is a diagram illustrating the processing. Depending on the position of the imager 117, when the corresponding user 20 draws, an occlusion area 27 that is invisible from the imager 117 occurs in an angle range 26 of the imager 117 due to being shielded by an object such as a drawn image 23 or a hand 24 holding the drawing tool. If, for example, an arm 25 of the corresponding user 20 is included in the occlusion area 27 and is not imaged, a visible light image and a distance image for the arm 25 are not acquired, and only a 3D model lacking the arm 25 can be generated. Therefore, in the present embodiment, the controller 113 supplements the missing portion using a supplementary image stored in the memory 112 in advance. The controller 113 also encodes information on the supplementary image for inclusion as part of the encoded information.

The controller 113 also derives the position of the drawn image relative to the corresponding user 20 based on the captured image of the corresponding user 20. For example, the position of the drawn image relative to the corresponding user 20 is derived based on the positional relationship between the imager 117 and the touch panel, and the positions of the corresponding user 20 and the drawn image relative to the imager 117. The controller 113 then determines the position at which to superimpose the drawn image on the 3D model of the corresponding user 20 so as to correspond to the derived position.

The controller 113 then uses the communication interface 111 to transmit the encoded information to the other terminal apparatus 12 via the server apparatus 10.

FIG. 2C illustrates the other user displayed on the terminal apparatus 12. A rendered image 22 including a 3D model 21 of the other user is displayed on the display of the display/output interface 116, along with the drawn image 23 drawn by the other user 21.

The controller 113 receives encoded information, transmitted from the other terminal apparatus 12 via the server apparatus 10, using the communication interface 111. Upon decoding the encoded information received from the other terminal apparatus 12, the controller 113 uses the decoded information to generate the 3D model 21 representing the other user who uses the other terminal apparatus 12. In generating the 3D model 21, the controller 113 generates a polygon model using the distance images of the other user and applies texture mapping to the polygon model using the captured images of the other user, thereby generating the 3D model 21 of the other user. This example is not limiting, however, and any appropriate method can be used to generate the 3D model 21. When generating the 3D model 21, the controller 113 generates a supplementary 3D model 28 to supplement the invisible arm 25 with a supplementary image, thereby supplementing the 3D model 21. The controller 113 generates the rendered image 22, from a virtual viewpoint, of the virtual space containing the 3D model 21. The virtual viewpoint is, for example, the position of the eyes of the corresponding user 20. The controller 113 derives the spatial coordinates of the eyes with respect to a freely chosen reference from the captured image of the corresponding user 20 and maps the result to spatial coordinates in the virtual space. The freely chosen reference is, for example, the position of the imager 117. The 3D model of the other user 21 is placed at a position and angle that enable eye contact with the virtual viewpoint. Furthermore, the controller 113 superimposes the drawn image 23 on the rendered image 22 to generate an image for display. The drawn image 23 is positioned to correspond to the position of the hand holding the drawing tool in the 3D model 21. The controller 113 uses the display/output interface 116 to display images for display and output speech of the other user 21 based on the audio information of the other user 21.

FIG. 3 is a sequence diagram illustrating the operating procedures of the call system 1. This sequence diagram illustrates the steps in the coordinated operation of the server apparatus 10 and the plurality of terminal apparatuses 12 (referred to for the sake of convenience as the terminal apparatus 12A and 12B when distinguishing therebetween). These steps are for the terminal apparatus 12A to call the terminal apparatus 12B. In a case of a plurality of terminal apparatuses 12B being called, the operating procedures for the terminal apparatus 12B illustrated here are performed by each terminal apparatus 12B, or by each terminal apparatus 12B and the server apparatus 10.

The steps pertaining to the various information processing by the server apparatus 10 and the terminal apparatuses 12 in FIG. 3 are performed by the respective controllers 103 and 113. The steps pertaining to transmitting and receiving various types of information to and from the server apparatus 10 and the terminal apparatuses 12 are performed by the respective controllers 103 and 113 transmitting and receiving information to and from each other via the respective communication interfaces 101 and 111. In the server apparatus and the terminal apparatuses 12, the respective controllers 103 and 113 appropriately store the information that is transmitted and received in the respective memories 102 and 112. Furthermore, the controller 113 of the terminal apparatus 12 accepts input of various types of information with the input interface 115 and outputs various types of information with the display/output interface 116.

In step S300, the terminal apparatus 12A accepts input of setting information by the corresponding user. The setting information includes a call schedule, a list of called parties, and the like. The list includes the username of the called party and each user's email address. In step S301, the terminal apparatus 12A then transmits the setting information to the server apparatus 10. The server apparatus 10 receives the information transmitted from the terminal apparatus 12A. For example, the terminal apparatus 12A acquires an input screen for setting information from the server apparatus 10 and displays the input screen to the user. Then, once the user inputs the setting information on the input screen, the setting information is transmitted to the server apparatus 10.

In step S302, the server apparatus 10 identifies the called party based on the setting information. The controller 103 stores the setting information and information on the called party in association in the memory 102.

In step S303, the server apparatus 10 transmits authentication information to the terminal apparatus 12B. The authentication information is information such as an ID or passcode for identifying and authenticating the called party who uses the terminal apparatus 12B. Such information is, for example, transmitted as an e-mail attachment. The terminal apparatus 12B receives the information transmitted from the server apparatus 10.

In step S305, the terminal apparatus 12B transmits the authentication information received from the server apparatus 10 and information on an authentication application to the server apparatus 10. The called party operates the terminal apparatus 12B and applies for authentication using the authentication information transmitted by the server apparatus 10. For example, the terminal apparatus 12B accesses a site provided by the server apparatus 10 for the call, acquires the authentication information and an input screen for information for the authentication application, and displays the input screen to the called party. The terminal apparatus 12B then accepts the information inputted by the called party and transmits the information to the server apparatus 10.

In step S306, the server apparatus 10 performs authentication on the called party. The identification information for the terminal apparatus 12B and the identification information for the called party are stored in association in the memory 102.

In steps S308 and S309, the server apparatus 10 transmits a call start notification to the terminal apparatuses 12A and 12B. Upon receiving the information transmitted from the server apparatus 10, the terminal apparatuses 12A and 12B begin the imaging and collection of audio of speech for the respective users.

In step S310, virtual face-to-face communication including a call between users is performed by the terminal apparatuses 12A and 12B via the server apparatus 10. The terminal apparatuses 12A and 12B transmit and receive information for generating 3D models representing the respective users, the drawn images, and information on speech to each other via the server apparatus 10. The terminal apparatuses 12A and 12B output images, including the 3D model representing the other user, and speech of the other user to the respective users.

Figure 4A:
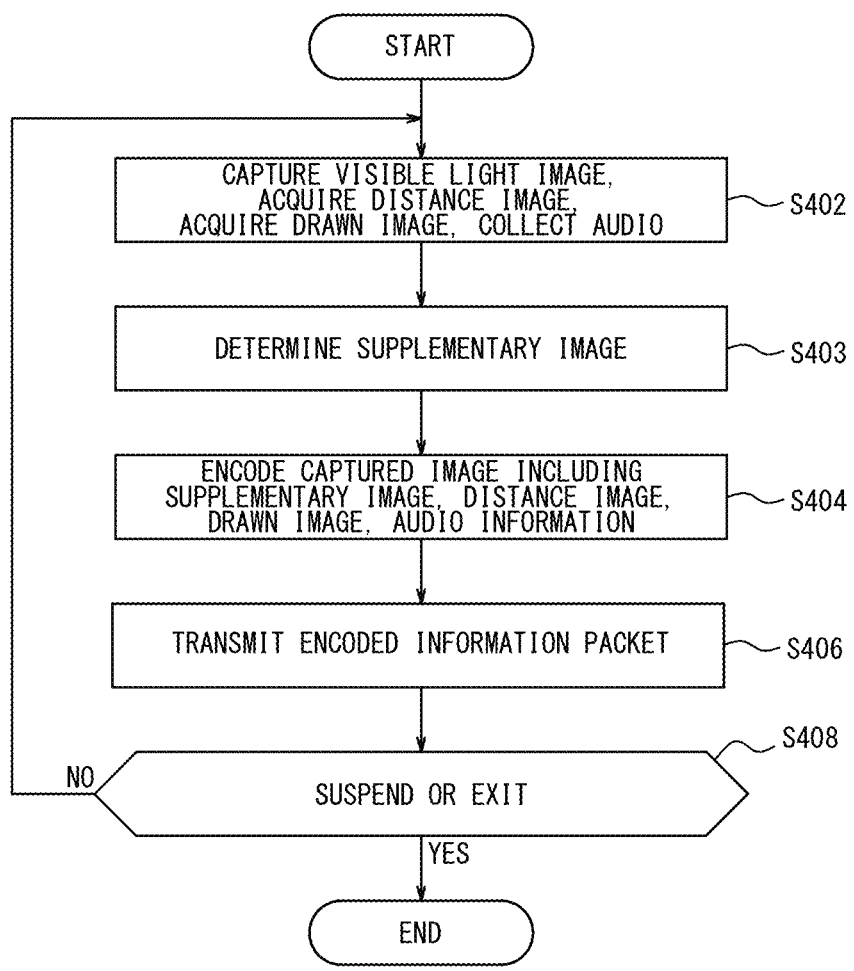
FIG. 4A is a flowchart illustrating an example of operations of a terminal apparatus.

FIGS. 4A and 4B are flowcharts illustrating the operating procedures of the terminal apparatus 12 for performing virtual face-to-face communication. The procedures illustrated here are common to the terminal apparatuses 12A and 12B and are described without distinguishing between the terminal apparatuses 12A and 12B.

FIG. 4A relates to the operating procedures of the controller 113 when each terminal apparatus 12 transmits information for generating a 3D model of the corresponding user who uses that terminal apparatus 12.

In step S402, the controller 113 acquires a visible light image and a distance image, acquires the drawn image, and collects sound. The controller 113 uses the imager 117 to capture the visible light image of the corresponding user and the distance image at a freely set frame rate. The controller 113 also acquires the drawn image via the input interface 115. Furthermore, the controller 113 collects sound of the corresponding user's speech via the input interface 115.

In step S403, the controller 113 determines the supplementary image. The supplementary image is an image that corresponds to an invisible portion in the captured image.

First, the controller 113 identifies the invisible portion. The invisible portion is the upper arm or forearm that is located behind the hand and is shielded from the camera of the imager 117 when the corresponding user extends the hand holding the drawing tool forward to draw on the touch panel. The controller 113 extracts the image of the hand holding the drawing tool by performing any appropriate image processing, such as pattern matching, on the captured image. When the image of the hand has a freely determined size that indicates proximity to imager 117, the forearm and upper arm connected to the hand are identified as the invisible portion. The controller 113 may determine the proximity of a hand to the imager 117 via the position of the touch panel when the distance from the touch panel to the hand, as detected by the detector 118, is equal to or less than a freely chosen standard.

Upon identifying the invisible portion, the controller 113 selects a supplementary image to supplement the invisible portion from the supplementary image samples stored in the memory 112. The supplementary image includes distance information necessary for 3D model generation. Samples of various supplementary images are stored in the memory 112. For example, samples of pre-generated forearm or upper arm images are stored for each of the left hand and right hand, each gender, each skin tone, each type of clothing (short or long sleeved), and each color of clothing. The controller 113 selects the best-fitting image sample by pattern matching with respect to the left or right hand, gender, skin tone, type of clothing, color of clothing, and the like of the corresponding user in the captured image. Alternatively, the controller 113 may detect, from a history of captured images, a captured image in which the invisible portion was captured and may create a supplementary image to supplement the invisible portion from that captured image and the corresponding distance image.

In step S404, the controller 113 encodes the captured image including the supplementary image, the distance image, the drawn image, and the audio information to generate encoded information.

In step S406, the controller 113 converts the encoded information into packets using the communication interface 111 and transmits the packets to the server apparatus 10 for the other terminal apparatus 12.

When information inputted for an operation by the corresponding user to suspend imaging and collection of audio or to exit the virtual face-to-face communication is acquired (Yes in S408), the controller 113 terminates the processing procedure in FIG. 4A, whereas while not acquiring information corresponding to an operation to suspend or exit (No in S408), the controller 113 executes steps S402 to S407 and transmits, to the server apparatus for the other terminal apparatuses 12, information for generating a 3D model representing the corresponding user, the drawn image, and information for outputting audio.

FIG. 4B relates to the operating procedures of the controller 113 when the terminal apparatus 12 outputs the image of the 3D model, the drawn image, and the audio of the other user. Upon receiving, via the server apparatus 10, a packet transmitted by the other terminal apparatus 12 performing the procedures in FIG. 4A, the controller 113 performs steps S410 to S413.

In step S410, the controller 113 decodes the encoded information included in the packet received from the other terminal apparatus 12 to acquire the captured image, distance image, drawn image, and audio information.

In step S412, the controller 113 generates a 3D model representing the corresponding user of the other terminal apparatus 12 based on the captured image and the distance image. In the case of receiving information from a plurality of other terminal apparatuses 12, the controller 113 executes steps S410 to S412 for each other terminal apparatus 12 to generate the 3D model of each corresponding user. In this case, the controller 113 generates a supplementary 3D model from the supplementary image in each 3D model and supplements the missing portion of the 3D model with the supplementary 3D model.

In step S413, the controller 113 places the 3D model representing the other user in the virtual space. The memory 112 stores, in advance, information on the coordinates of the virtual space and the coordinates at which the 3D models should be placed according to the order in which each other user is authenticated, for example. The controller 113 places the generated 3D model at the coordinates in the virtual space.

In step S414, the controller 113 generates an image for display. The controller 113 generates a rendered image, captured from a virtual viewpoint, of the 3D model placed in the virtual space. The controller 113 then superimposes the drawn image on the rendered image at the position corresponding to the 3D model to generate an image for display.

In step S416, the controller 113 uses the display/output interface 116 to display the image for display while outputting audio.

By the controller 113 repeatedly executing steps S410 to S416, the corresponding user can listen to the speech of another user while watching a video that includes the 3D model of the other user and the drawn image that is drawn by the 3D model. At this time, the missing portion of the 3D model is supplemented by the supplementary 3D model, enabling the user to view a more natural image of the other user and enhancing the realistic feel.

Instead of step S403 in FIG. 4A, the controller 113 may, in step S412 in FIG. 4B, identify the invisible portion from the captured image received from the other terminal apparatus 12, determine the supplementary image, and generate the supplementary 3D model.

In the above example, the terminal apparatus 12 receives information for generating a 3D model of the other user, i.e., the captured image, the distance image, and the like, from the other terminal apparatus 12 before generating the 3D model and generating a rendered image of the 3D model placed in the virtual space. However, processes such as generation of the 3D model and the corresponding supplement and generation of the rendered image may be distributed between the terminal apparatuses 12 as appropriate. For example, a 3D model of the other user and the corresponding supplementary 3D model may be generated by the other terminal apparatus 12 based on the captured image and the like, and the terminal apparatus 12 that receives the information on these 3D models may generate the rendered image using the 3D models.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus, comprising:
a communication interface;
a display;
an imager configured to capture images of a user; and
a controller configured to communicate using the communication interface, wherein the controller is further configured to:
receive information for displaying a 3D model representing another user, who uses another terminal apparatus, based on a captured image of the another user and a supplementary image that includes an invisible portion of the captured image,
generate the 3D model from the captured image, the 3D model including a missing portion corresponding to the invisible portion in the captured image,
generate a supplementary 3D model from the supplementary image, the supplementary 3D model representing the invisible portion, and
control the display to display the 3D model in which the missing portion in the 3D model is supplemented by the supplementary 3D model,
the terminal apparatus further comprises an input interface with a touch panel superimposed on the display,
the invisible portion is an arm that is shielded from the imager by a hand holding a drawing tool when the another user draws on the touch panel with the hand, and
the controller is further configured to: extract, from the captured image of the another user, an image of the hand, by performing image processing on the captured image of the another user, and identify the arm as the invisible portion when the image of the hand has a predetermined size that indicates proximity of the hand to the imager.

2. The terminal apparatus according to claim 1, further comprising a memory configured to store samples of the supplementary image, wherein
the controller is further configured to;
receive, from the another terminal apparatus, information on a supplementary image selected from the samples of the supplementary image and corresponding to the invisible portion, or select, from the samples of the supplementary image, the supplementary image corresponding to the invisible portion in the captured image received from the another terminal apparatus.

3. The terminal apparatus according to claim 1, wherein the controller is further configured to:

receive, from the another terminal apparatus, information on the supplementary image acquired from a history of the captured image, or acquire the supplementary image from a history of the captured image received from the another terminal apparatus.

4. The terminal apparatus according to claim 1, wherein the controller is further configured to determine the proximity of the hand to the imager via a position of the touch panel upon detecting that a distance from the touch panel to the hand is equal to or less than a predetermined value.

* * * * *